(No Model.)
D. J. SMITH, Jr.
PRICE AND WEIGHING SCALE.
No. 534,484. Patented Feb. 19, 1895.
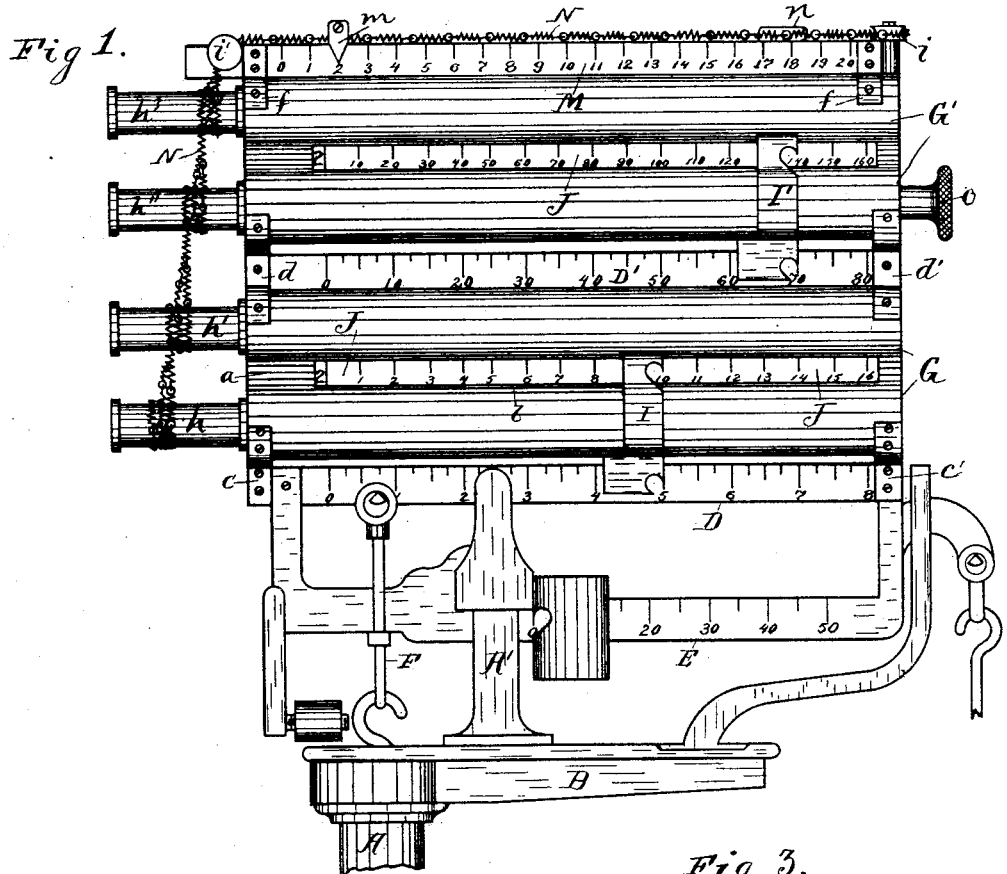
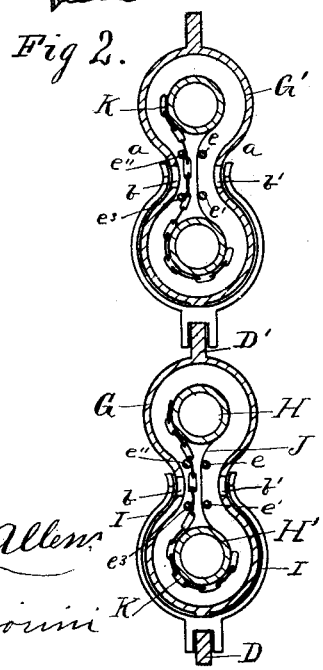
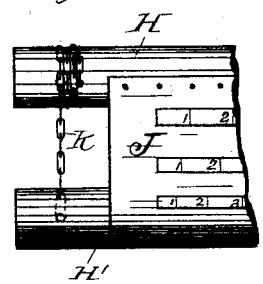
WITNESSES:
Lester L. Allen
A. J. Fiorini
INVENTOR
D. J. Smith, Jr.
BY
R. J. McCarty.
ATTORNEY.

UNITED STATES PATENT OFFICE.

DRURY J. SMITH, JR., OF DAYTON, OHIO.

PRICE AND WEIGHING SCALE.

SPECIFICATION forming part of Letters Patent No. 534,484, dated February 19, 1895.

Application filed December 12, 1894. Serial No. 531,569. (No model.)

*To all whom it may concern:*

Be it known that I, DRURY J. SMITH, Jr., of Dayton, county of Montgomery, State of Ohio, have invented a new and useful Improvement in Price and Weighing Scales; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to price and weighing scales, and embodies certain features that are improvements of the scale shown and described in a pending application, filed by myself, in the United States Patent Office, June 22, 1894, Serial No. 515,443.

The said improvements have means for preserving the gravity of the index sheet with reference to the pivot line of the scale, to the end that the shifting of said sheet will not affect the gravity of said scale.

Said improvements have a further reference to a chain for rotating the rollers upon which the index sheet is wound, that will not be materially affected by contraction or expansion due to varying temperatures, or wear; and said improvements have further reference to a balance or counter-weight attached to said chain, to counter-balance the sliding price-per-pound poise as it is moved along the price-per-pound bar.

Referring to the annexed drawings, Figure 1, is a side elevation of the upper part of a beam scale having my improvements mounted thereon. Fig. 2, is a vertical section through the cylinders. Fig. 3, is an enlarged broken view, showing an end of the index sheet, the rollers upon which said sheet is mounted, and the gravity chain. Fig. 4, is an enlarged view of a part of the combined spring and chain by which the rollers are rotated.

Similar letters of reference indicate corresponding parts in the several views.

A is a standard rising from the platform of the scale (not shown).

B designates the cap or upper platform, and A' a yoke or post upon which the beams are fulcrumed. The beams D and E are the ordinary weight and tare beams, the former of which is flexibly connected with the steelyard rod by the coupling link F.

The foregoing features are well known in scale mechanism, and therefore do not call for a detailed description.

G is a metallic cylinder, preferably made of sheet metal, the longitudinal sides of which curve inwardly, as shown at (a); and have longitudinal slots (b) and (b') on alignment with each other. This cylinder lies parallel with the weight beam D, and is rigidly mounted thereon by means of plates (c) and (c').

H and H' designate rollers, the ends of which are journaled in the ends of the cylinder G, and have extensions (h) and (h') that project beyond the end of said cylinder for the purpose hereinafter described. Upon these rollers, a sheet J, of celluloid or other material having the requisite tenacity, is placed, and adapted to be wound and rewound, the longitudinal edges of said sheet being suitably secured to the rollers, substantially as shown in Fig. 3. This flexible sheet contains numerals indicating the values in money, of quantities of goods, and which are duplicated on both sides of the sheet, those on one side being in alignment with those on the other side, so that the same figures may be seen through the longitudinal sight openings (b) and (b'). This sheet is maintained in a central position so as to be plainly visible through both openings, by guide rods or rollers (e) and (e'), the ends of which are mounted in the ends of the cylinder in any suitable manner.

I, designates a double poise that rides the beam D; incloses the lower half of the cylinder, and points to the figures on the index sheet, and the weight beam.

In order to increase the capacity of the scale, I duplicate the foregoing mechanism, in the cylinder G', and interpose a supplemental weight beam D', maintained in position by plates (d) and (d') which support said upper cylinder G'. On the end of each pair of the rollers inclosed in said cylinders, I attach a gravity chain K in a manner to wind in a direction opposite to that of the sheet J, as shown in Fig. 3, where it will be noted, the sheet is wound to the limit around the lower roller, while the chain is similarly wound around the upper roller; the winding of both sheet and chain in the opposite manner being simultaneous.

It is of course, important in order to preserve the gravity of the scale in an unchangeable condition, to have the weight of the chain and sheet, the same, otherwise the changing of the scale's gravity, due to shifting the index sheet from one roller to the other will not be overcome.

($e''$) and ($e^3$) designate parallel guide rods or rollers similar to those designated by ($e$) and ($e'$) that serve to keep the gravity chain K inwardly, as shown in Fig. 2.

M, designates a parallel bar or price per pound scale, mounted on supporting plates ($f$) attached to the upper cylinder. This bar contains numerals designed to indicate the prices per pound of various goods.

($i$) and ($i'$) are pulleys, suitably mounted above the upper cylinder, and on a line with the price per pound scale M. Coming now to the means employed for simultaneously moving the index sheets to bring before the sight openings ($b$) and ($b'$), the proper figures to indicate the value of the quantity of the goods sold at a given price per pound, N designates a chain. In order to fully adapt a chain to perform this function, now to be described, it must possess to a desirable extent, the qualities of flexibility and resiliency, in order that a contraction and expansion of the metal therein, will not have any appreciable effect. These qualities I obtain by constructing a chain N, of a plurality of short springs, linked together substantially as shown in Fig. 4, and made into an endless piece. This chain surrounds pulley ($i$); extends parallel with and above the price per pound scale M; downwardly over pulley ($i'$), and is wrapped around each of the exposed ends ($h$), ($h'$), ($h''$) and ($h^3$) of the sheet rollers a sufficient number of times to permit the desired movement of said rollers. One strand or side of the chain is fixed to each of said ends so that the rotation of the rollers in either direction will be in exact proportion to the movement of the chain N, and that all of said rollers be subjected to a common movement.

($m$) designates the price per pound poise, fixed to the chain and adapted to ride upon the bar indicating the prices per pound. On the opposite side of the chain, ($n$) indicates a counter-weight or poise, fixed to said chain, and movable in the opposite direction from the sliding poise ($m$). The object of this counter weight is to maintain a perfect balance of the scale while moving the poise ($m$) to indicate the prices per pound.

Rigidly attached to one end of one of the intermediate rollers, is a finger piece ($o$) by means of which the said rollers may be turned, and the chain N set in motion to move the poise ($m$) to the proper point on the scale M, and simultaneously operate the index sheet, or said chain may be operated by moving the poise ($m$) by the hand.

The operation of the scale is simple, and is briefly as follows: Five pounds of an article is wanted that retails at two cents a pound. The poise I, on the weight beam D, is moved to "5." The price per pound poise ($m$) is moved to "2" on the bar M. This movement of said poise ($m$) moves the sheet J, upon which the values of the quantities of goods sold appear, and said movement will bring "10" on said sheet to the pointer on the upper part of the poise I. It will be noted that the capacity of the beam D is limited to eight pounds.

By means of the supplemental weight beam D', the weighing capacity of the scale is increased eighty pounds, or ten times the capacity of beam D, and the operation of the supplemental mechanism is the same as above described. The double poise I' is moved say to "70" on the beam D'; the price per pound poise to "2" on the bar M. This latter movement will bring "140" on the index sheet to the upper pointer on the poise I', indicating that seventy pounds of an article selling at two cents per pound will amount to one dollar and forty cents.

Having fully described my invention, I claim—

1. In a price and weight scale, the combination with weight beams, of a flexible sheet upon both sides of which the values of quantities of goods sold, appear; rollers upon which said sheet is wound; a gravity chain on said rollers to maintain an unchangeable gravity of the scale as said sheet is unwound from one roller to another, and means for unwinding said sheet, substantially as described.

2. In a price and weight scale, the combination with weight beams; of a flexible sheet upon both sides of which money values of quantities of goods sold, appear; rollers upon which said sheet is wound; means upon said rollers to maintain the gravity as said sheet is wound from one roller to another, and a combined resilient and flexible chain, as described for revolving said rollers.

3. In a price and weight scale, the combination with weight beams; of flexible sheets mounted upon rollers, above said beams, said sheets having numerals indicating the costs of specific quantities of goods; a price per pound scale adjacent to said sheets; pulleys mounted adjacent to said price per pound scale, and on a horizontal plane therewith; a flexible and resilient chain interposed between said pulleys, and the rollers to which said sheets are attached; a sliding poise and a counter balancing weight attached to said chain, substantially as described.

4. In a price and weighing scale, the combination with a weight beam; of cylinders provided with sight openings, mounted above said beam; a supplemental weight beam interposed between said cylinders; rollers inclosed in said cylinders; flexible sheets attached to said rollers; a flexible gravity device on said rollers; a price per pound scale mounted above said cylinders; a sliding poise movable along said scale; and a flexible and resilient chain interposed between said rollers and to which said sliding poise is attached; a counter weight also attached to said chain, substantially as described.

In testimony whereof I have hereunto set my hand this 6th day of December, 1894.

DRURY J. SMITH, JR.

Witnesses:
R. J. McCARTY,
LESTER L. ALLEN.